(No Model.)
W. OWEN & W. K. BIRKINSHAW.
PICK OR SIMILAR TOOL.
No. 565,789. Patented Aug. 11, 1896.
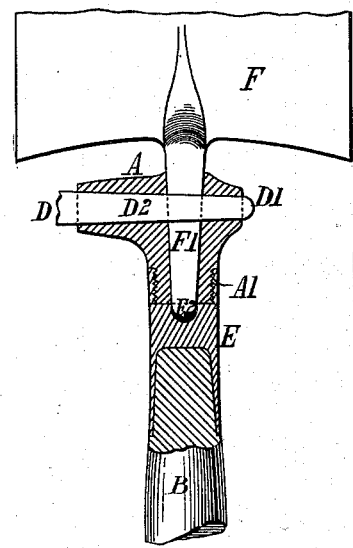
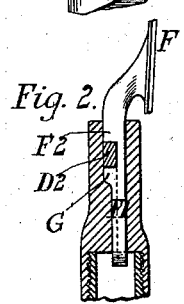
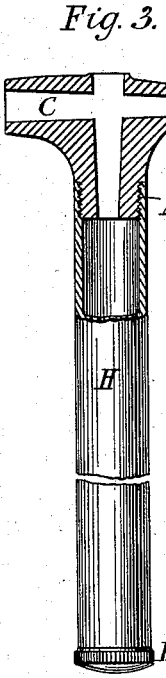
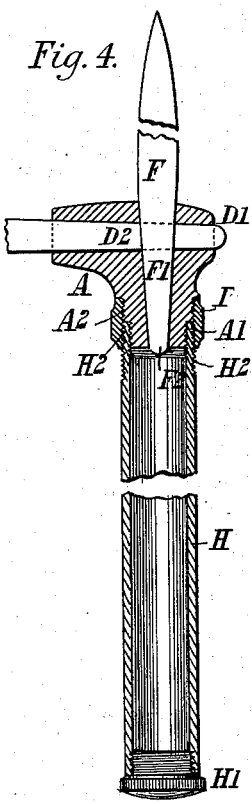
Witnesses:
J. M. Fowler Jr.
Wallace Murdock
Inventors.
William Owen and
William K. Birkinshaw.
by Church & Church
their Attorneys

UNITED STATES PATENT OFFICE.

WILLIAM OWEN, OF LONDON, AND WILLIAM KIRKLEY BIRKINSHAW, OF DERBY, ENGLAND.

PICK OR SIMILAR TOOL.

SPECIFICATION forming part of Letters Patent No. 565,789, dated August 11, 1896.

Application filed May 27, 1893. Serial No. 475,766. (No model.) Patented in England April 19, 1893, No. 7,964; in France May 16, 1893, No. 230,109; in Belgium May 16, 1893, No. 104,679; in Germany May 16, 1893, No. 79,859; in Italy May 16, 1893, No. 34,080/492; in Turkey May 16, 1893, No. 340; in Spain June 30, 1893, No. 14,587, and in Austria-Hungary October 11, 1893, No. 27,541 and No. 50,799.

*To all whom it may concern:*

Be it known that we, WILLIAM OWEN, of London, and WILLIAM KIRKLEY BIRKINSHAW, of Derby, England, subjects of the Queen of England, have invented certain new and useful Improvements in Picks or Similar Tools, (for which we have obtained Letters Patent in Great Britain, No. 7,964, dated April 19, 1893; in France, No. 230,109, dated May 16, 1893; in Belgium, No. 104,679, dated May 16, 1893; in Germany, No. 79,859, dated May 16, 1893; in Austria-Hungary, No. 27,541 and No. 50,799, dated October 11, 1893; in Italy, No. 34,080/492, dated May 16, 1893; in Spain, No. 14,587, dated June 30, 1893, and in Turkey, No. 340, dated May 16, 1893,) of which the following is a specification.

This invention relates to picks and similar tools or implements for mining, for military purposes, and the like, and will be best understood by reference to the accompanying drawings. These drawings show modifications in the construction, though the same principles underlie all of them.

In the drawings, Figure 1 is a view partly in section, showing a tool holder or head constructed in accordance with our invention. Figs. 2, 3, and 4 are similar views showing modifications.

A represents the head, preferably made of cast-steel, secured upon the handle B in any suitable manner. The head is preferably removable from the handle for a purpose to be hereinafter explained, and to accomplish this the head is formed with a screw-thread, as at A', and is screwed into a socket E, into which the handle B is fitted and secured by riveting in the usual manner.

Extending through the head A in the axial line of the handle is a socket, preferably tapered, which receives the tapered shank F' of a tool F, and extending transversely through the head is a second socket, also preferably tapered, which receives the shank $D^2$ of a second tool D. The tool F may be of any description, conveniently a shovel, as shown in Fig. 1, and to facilitate removing it for any purpose the head A may be unscrewed and the end $F^2$ of the shank be got at for the purpose of driving the tool out. The tool F may be used with the tool D in position or not, as desired. When the two tools are made to fit the same head, as in Fig. 1, they may be placed slightly off the center line so as to pass each other, as shown in Fig. 2. In this case the shank $D^2$ is shown engaging with a portion or shoulder $F^2$ of the shank F' of the tool F, the remaining portion of which shank may be formed parallel in one direction, as shown in dotted lines in Fig. 2, the intention being that by driving in the shank $D^2$ it will act as a wedge $F^2$ to drive out the shank F' and thus release the tool F without the necessity of unscrewing, or, indeed, using at all, the socket E for the handle B. In said Fig. 2, however, a projecting portion G is shown upon the shank F', the shank $D^2$ of the other tool being shown in front of F' and between $F^2$ and G. With this arrangement the shank $D^2$ would serve to hold the shank F' securely in the head A, and even to draw it into position should it be undesirable to strike the tool F. As a rule, however, the difficulty is not to secure the shank sufficiently firmly in the head, but to get it out of the head after the tool has been used, as it is found that the blows upon the tool usually result in fixing it very securely in the head. Consequently the stop G would not usually be required.

In Fig. 3 the head A is shown screwed at A' into the open end of a metal tube H, which serves as the handle, and may be closed at its other end by a cap or plug H' of any suitable construction and screwed or otherwise fitted in or secured to the tube-handle H. With this arrangement, by removing the cap H' the interior of the handle H may be used to carry duplicate tools or for other purposes, and will be of considerable service to the person using the tool, especially where it is required for military purposes. The tube H may be permanently fixed to the head A by casting or other suitable means, if desired, but in order to facilitate the driving out of the shank F' of the axial tool, as previously described, it is convenient to screw the handle H onto the head A, so that it may be unscrewed, and the end F² of the shank will then be accessible and the tool F can easily be driven out. Where the two tools are not required to be in the head at the same time, the axial and cross sockets may be made in the same plane as indicated in Fig. 3.

In Fig. 4 a tube-handle H and cap H' are shown, as in Fig. 2, and the general construction of head is similar to that shown in Figs. 1 and 2, but for the purpose of making a secure joint between the handle H and the head A the head is shown screwed at A' into the inside of the tube H, while the tube H is screwed externally at H² and the head A is screwed to the same diameter at A², making a continuous screw from H² to A² a nut I being adapted to screw upon both and thus complete a very secure fastening.

In case of emergency, and this again is particularly useful for military purposes, the pick-point may be placed in the axial socket, as illustrated in Fig. 4, and the tool can then be used as a pike, the point serving as a bayonet.

If desired, the arrangements for securing in the head or driving out of the head the shank F' by means of the shank D² may be revised and the shank F' may be arranged to hold in or drive out the shank D², although as the end D' of the shank D² can always be got at there would usually be no necessity for this.

We claim—

1. In a pick or tool, such as described, the combination with the handle, of the head having the sockets arranged transversely and axially thereof, and tools having shanks fitting in said sockets respectively; substantially as described.

2. In a pick or tool, such as described, the combination with the handle, of the head having the socket extending through the same transversely, the tapered axial socket and the tool having a tapered shank fitting therein; substantially as described.

3. In a pick or tool, such as described, the combination with the handle, of the removable head having the tapered axial socket extending way through the same, and a tool having a shank passing way through said socket whereby the head may be removed and the tool released by striking its rear end; substantially as described.

4. In a pick or tool, such as described, the combination with the handle, of the head having the transverse and tapered axial sockets intersecting each other and the tool having the shoulder-shank fitting in the axial socket and coöperating with the shank of the tool fitting in the transverse socket; substantially as described.

5. In a pick or tool, such as described, the combination with the hollow handle, of the head screwed onto the same and having the transverse and the axial sockets extending through the same; substantially as described.

In testimony whereof we have hereto set our hands in the presence of the two subscribing witnesses.

WILLIAM OWEN.
WILLIAM KIRKLEY BIRKINSHAW.

Witnesses:
HARO W. WADE,
HENRY HAIGH.